United States Patent
Schroeder et al.

(10) Patent No.: US 11,309,803 B2
(45) Date of Patent: Apr. 19, 2022

(54) POWER CONVERTER FOR TRASMITTING POWER BETWEEN NETWORKS

(71) Applicant: Vacon Oy, Vaasa (FI)

(72) Inventors: Stefan Schroeder, Ismaning (DE); Dan Isaksson, Durham, NC (US); Risto Komulainen, Klaukkala (FI); Stefan Strandberg, Vörå (FI)

(73) Assignee: Vacon Oy, Vaasa (FI)

( * ) Notice: Subject to any disclaimer, the term of this patent is extended or adjusted under 35 U.S.C. 154(b) by 188 days.

(21) Appl. No.: 16/878,732

(22) Filed: May 20, 2020

(65) Prior Publication Data
US 2020/0373848 A1   Nov. 26, 2020

(30) Foreign Application Priority Data
May 21, 2019 (DK) .............................. PA201900609

(51) Int. Cl.
*H02M 5/458* (2006.01)

(52) U.S. Cl.
CPC ................................ *H02M 5/4585* (2013.01)

(58) Field of Classification Search
CPC ............. H02M 5/4585; H02M 1/0043; H02M 1/0074; H02M 1/0077; H02M 3/33584; H02M 5/225; H02M 7/49; H02M 7/4807; H02M 5/458; H02J 3/02
See application file for complete search history.

(56) References Cited

U.S. PATENT DOCUMENTS

| | | | |
|---|---|---|---|
| 5,625,545 A | 4/1997 | Hammond | |
| 8,279,640 B2* | 10/2012 | Abolhassani | ........... H01F 30/12 363/37 |
| 2010/0142234 A1* | 6/2010 | Abolhassani | ....... H02M 5/4585 363/41 |

(Continued)

OTHER PUBLICATIONS

Received STIC search report from EIC 2800 searcher Salim Alam for claim 1 on May 20, 2021. (Year: 2021).*

(Continued)

*Primary Examiner* — Emily P Pham
*Assistant Examiner* — Htet Z Kyaw
(74) *Attorney, Agent, or Firm* — McCormick, Paulding & Huber PLLC

(57) ABSTRACT

A converter circuitry between a first network, which may be either a poly-phase medium-voltage alternating current (AC) network, at least one polyphase low-voltage AC network or at least one direct-current (DC) network, and a second network, which may be either a polyphase medium-voltage AC network or a medium-voltage DC network, wherein the converter circuitry comprises at least one power bus and low-voltage power cells both at the first and at the second network side such that each power cell is connected to a power bus via a transformer. Each power bus is connected to a low-voltage power unit, which is able to supply pre-charging power via the power bus to all power cell intermediate DC-link filtering capacitors before the converter is started. The low-voltage power unit is also able to take care of a resistor braking in case the first network cannot take the power supplied by the load connected to the second network.

20 Claims, 5 Drawing Sheets

(56) References Cited

U.S. PATENT DOCUMENTS

| | | | |
|---|---|---|---|
| 2010/0327793 A1* | 12/2010 | Komulainen | H02M 7/49 318/503 |
| 2012/0181955 A1* | 7/2012 | Sodo | H02P 25/22 318/375 |
| 2018/0198377 A1* | 7/2018 | Keister | H02M 1/42 |

OTHER PUBLICATIONS

Received STIC search report from EIC 2800 searcher Salim Alam for claim 2 on Sep. 27, 2021. (Year: 2021).*

* cited by examiner

Fig. 1          PRIOR ART

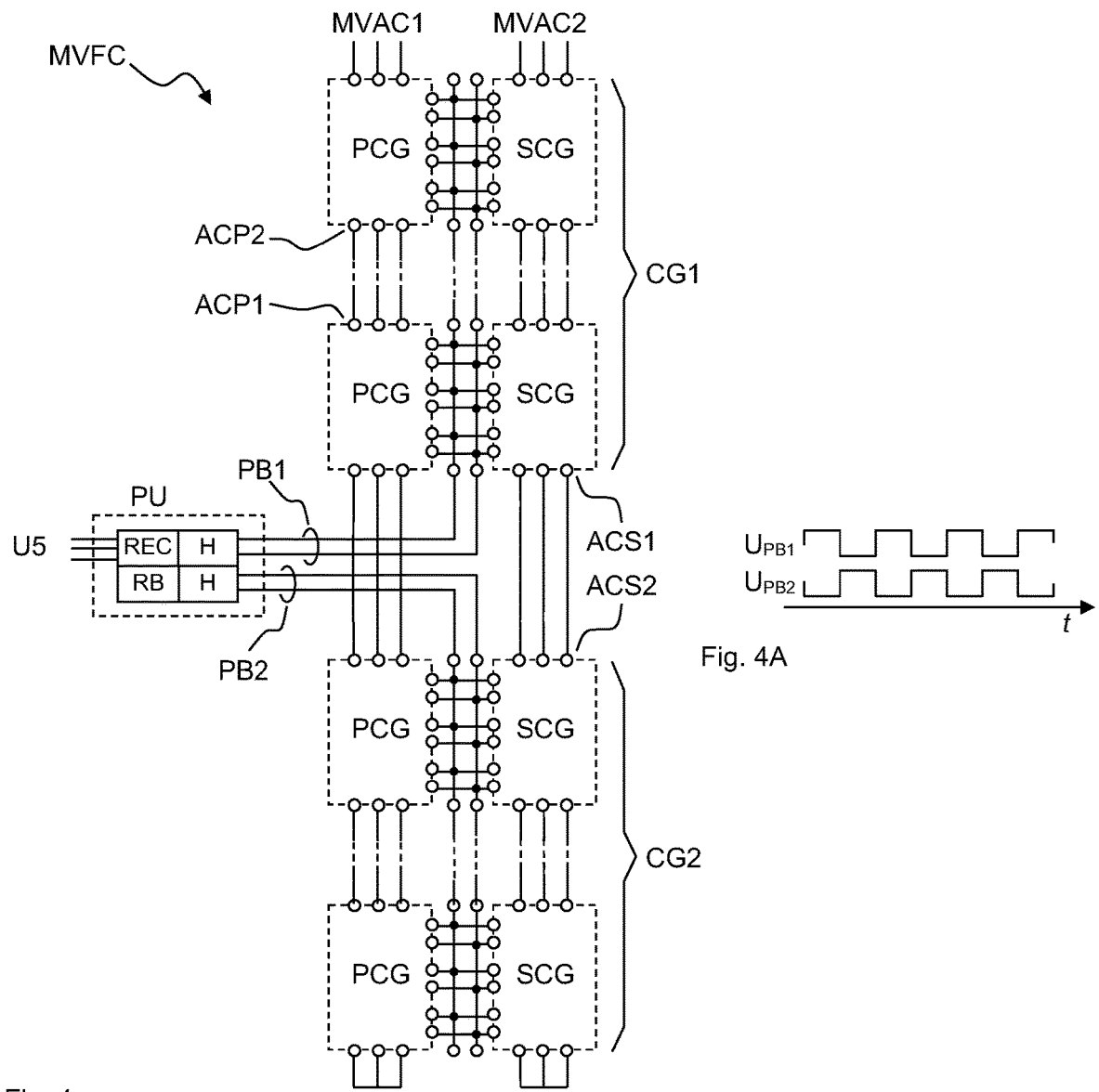
Fig. 4
Fig. 4A
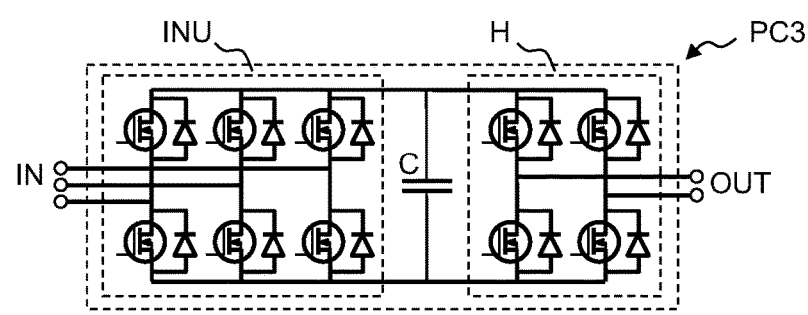
Fig. 5A

POWER CONVERTER FOR TRASMITTING
POWER BETWEEN NETWORKS

CROSS-REFERENCE TO RELATED
APPLICATION

This application claims foreign priority benefits under 35 U.S.C. § 119 to Danish Patent Application No. PA201900609 filed on May 21, 2019, the content of which is hereby incorporated by reference in its entirety.

TECHNICAL FIELD

The present invention relates to an apparatus and a method for a power converter for transmitting power between two electric networks. The first network can be either a polyphase alternating current (AC) network or a direct-current (DC) network. The second network can be a polyphase AC network having the same or different voltage level and the same or different frequency than the first AC network or a DC network.

BACKGROUND

A medium-voltage network refers to an electricity distribution network of over 1 kV that is used in the transmission of electrical energy e.g. between a high-voltage (over 36 kV) main grid and a low-voltage (below 1 kV) consumer network. Electricity distribution networks normally operate with 50/60 Hz frequency, but there exist also medium- or high-voltage DC distribution networks.

It is known in the art that it is advantageous to use medium-voltage in heavy-duty electrical devices owing to the smaller current and, as a consequence of this, smaller power losses. Often some kind of adjuster is needed between an electric machine and an electricity distribution network, owing to the different frequencies, different voltage levels or the need for galvanic isolation. This adjustment can be arranged advantageously by means of a frequency converter and a transformer.

The voltage endurance of the switch-type power semiconductor components used in frequency converters is, for reason of manufacturing technology, so small that at medium-voltage a number of them must be connected in series. An additional advantage of the serial connection is that the pulse pattern of the output voltage comprises a number of steps between the extreme positive and extreme negative value which reduces dangerous voltage spikes at the load, caused by the known reflection phenomenon that occurs with long cables.

A known solution to arrange the serial connection of low-voltage power components in order to meet the requirements of a medium-voltage frequency converter is presented e.g. in patent publication U.S. Pat. No. 5,625,545. In a converter according to it, as presented in FIG. 1, a transformer $T_1$ is used between the three-phase supplying medium-voltage network $U_1$ and the three-phase medium-voltage load network $U_2$. Transformer $T_1$ has one three-phase primary winding $W_P$ and a number of low-voltage secondary windings $W_{G11U} \ldots W_{GNW}$, each coupled to a low-voltage power cell $P_{C11U} \ldots P_{CNW}$, respectively. The power cells are arranged in serial-connected groups $G_{11} \ldots G_N$, such that each group comprises one power cell for each load side phase $U_{2U}, U_{2V}, U_{2W}$. This kind of a serial connection of power cells is called a cascade circuit, which by a proper control is able to produce a multistep voltage pattern to the load. The control details are part of general knowledge of the art, so they are not discussed further in this context. The multistep voltage pattern imitates a sine wave, thus being advantageous e.g. from the viewpoint of the voltage reflection and filtering. Since the transformer operates at the frequency of the supplying network, the size and cost of it are high, which is generally a problem in this system.

SUMMARY

The objective of the present invention is to achieve a novel converter circuitry without the disadvantages of the prior art, like without a heavy transformer. The present invention enables a wide variety of power converters with unidirectional or with bidirectional power transmission, e.g. a frequency converter embodiment with a technically advantageous multistep voltage pattern in the connection of both the supply AC network side and the load AC network side. Additionally, the converter circuitry enables an inverter embodiment between a DC supply network, such as a medium-voltage power transmission line or a low-voltage solar power network, and a medium-voltage load AC network. The converter circuitry also enables an inverter embodiment between a low or medium-voltage AC supply network and a low or medium-voltage load DC network or e.g. DC storage such as batteries. Structurally, the various converters which the invention makes possible, are modular so that a wide variety of devices can be assembled from similar low-voltage power cells.

The term medium-voltage is here used as a synonym for high voltage, i.e. medium-voltage and high voltage are interchangeable.

According to the present invention, the converter circuitry between two electricity networks comprises at least one power bus (PB) that transmits power between the power cells of the converter circuitry using AC voltage, and a plurality of low-voltage power cells both at the first and at the second electricity network sides such that each power cell is connected to a power bus via a transformer. The frequency at the transformer connection is advantageously high, e.g. higher than 1 kHz, which enables a small size transformer. According to the voltage level of the first electricity network, which is usually the power source side and called also as primary side in this context, the power cells may be coupled in series or in parallel. The second electricity network, which is usually the load side and also called as secondary side in this context, is usually medium-voltage.

According to the present invention, the converter circuitry comprises a low-voltage power unit, which is configured to generate an AC voltage to the power bus. Advantageously the AC voltage has a rectangular waveform with varying pulse ratio. This feature is exploited at startup of the converter circuitry such that the low-voltage power unit generates a rectangular voltage with increasing pulse ratio from 0 to 50%, thus supplying a voltage with rising effective value to the at least one power bus and further via the transformers and internal diodes of the power cells to the intermediate DC links of the power cells, thus charging up the intermediate DC link capacitors of the power cells.

When the intermediate DC link capacitor have been pre-charged, the internal auxiliary power supplies of the power cells will start up, enabling the normal operation of the converter circuitry. After that the primary terminals of the converter circuitry can be connected to the supplying first electricity network. Noteworthy is, that without the capacitor pre-charge the converter circuitry cannot be connected to the supplying network due to a harmful high inrush current caused by the uncharged capacitors. Noteworthy is also, that capacitor pre-charge of all the power cells of the converter can be done simultaneously with one single low-voltage power unit regardless of the voltage magnitude of the first or the second electricity network. According to the invention, the low-voltage power unit stops supplying power to the power bus after the normal operation of the converter circuitry has started.

According to the invention, the converter circuitry comprises a control unit, which is operatively connected to all power cells belonging to the circuitry. During the normal operation of the converter circuitry, the control unit is configured to control the controllable power semiconductor switches of those H-bridges, which are connected to the power cell output connection and further to a power bus via a transformer, such that the voltage waveforms of all output connections (OUT) of the low-voltage power cells connected to the same power bus are essentially cophasal with 50% pulse ratio or equivalent. Due to the simultaneous operation of the H-bridges connected to a common power bus, the intermediate circuits of the power cells are virtually bound together, which enables the power flow from a DC-link capacitor with higher voltage to a DC-link capacitor with lower voltage. This effect forms the basis for the operation of the converter according to the present invention.

In addition, in cases where the number of power buses is 2 or more, the control unit controls the H-bridges such that there is a phase shift angle between the voltage waveforms of different power buses. Phase shifting has a beneficial effect on decreasing the high-frequency emission from the device to the environment. According to the invention, the converter circuitry can also have only one power bus.

According to the invention, the secondary side of the converter circuitry is usually connected to a medium-voltage network. That is why the power cells on the secondary side are arranged in a cascade coupling similar to the prior art converter of FIG. 1, such that the input connections (IN) of the power cells are coupled in series in each phase. A similar coupling is used also in the primary side of the converter circuitry in case the supply side first electricity network level is medium-voltage.

The converter circuitry according to the invention is applicable also for voltage transformation e.g. such that the first electricity network is low-voltage and the second electricity network is medium-voltage (or vice versa). At the low-voltage side, the power cells may be connected in parallel to a single network or separately to different networks.

The converter circuitry according to the invention is applicable also for voltage transformation between two medium-voltage networks with different voltage level. In this case the number of serially connected power cells in primary and secondary sides of the converter is different.

The converter circuitry according to the invention is applicable also for frequency transformation e.g. such that the first electricity network is 50 Hz and the second electricity network is 60 Hz or any other desired frequency.

The converter circuitry according to the invention is able to transfer both active and reactive power.

The converter circuitry according to the invention is applicable also as an inverter between a DC network and a medium-voltage AC network. The DC network can be medium-voltage, as used in power transmission, in which case the power cells in the primary side are connected in series. In case of a low-voltage DC network, as used e.g. in solar power systems or battery chargers, the power cells in the primary side are connected in parallel. The power cell type used in DC network connections is a specific for its purpose.

The invention is defined in more detail in the present description and the following examples of embodiments. The scope of the protection is defined in the independent claims and the preferred embodiments in other claims.

BRIEF DESCRIPTION OF THE DRAWINGS

Below the invention is presented with more detailed explanations using examples with references to the enclosed figures, wherein FIG. 1 presents a prior art frequency converter circuit between a medium-voltage supply network and an medium-voltage load network, FIG. 4 presents a medium-voltage frequency converter according to an exemplifying and non-limiting embodiment of the present invention, FIG. 4A illustrates the voltage waveforms in a circuitry with two power buses according to the present invention, FIG. 5A presents a power cell according to an exemplifying and non-limiting embodiment of the present invention.

FIG. 1 has already been explained in the Background of the invention-section of this document.

DETAILED DESCRIPTION

Figure 1A:
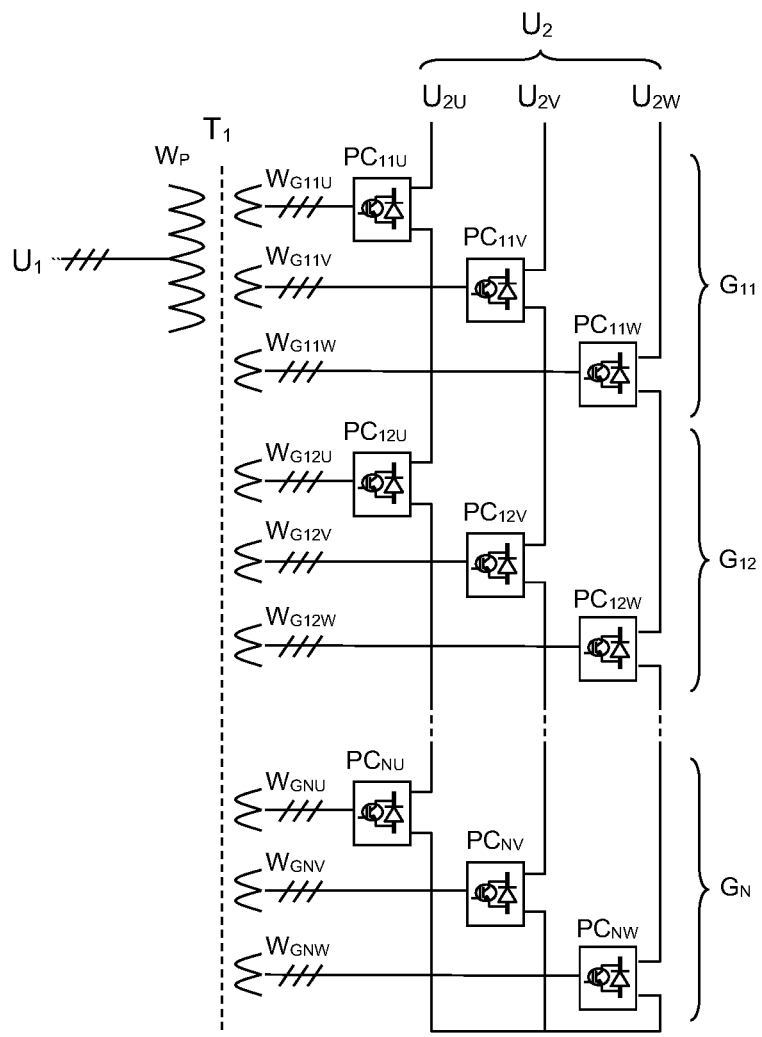
FIG. 1A presents a power cell of a prior art frequency converter.
Figure 1A:
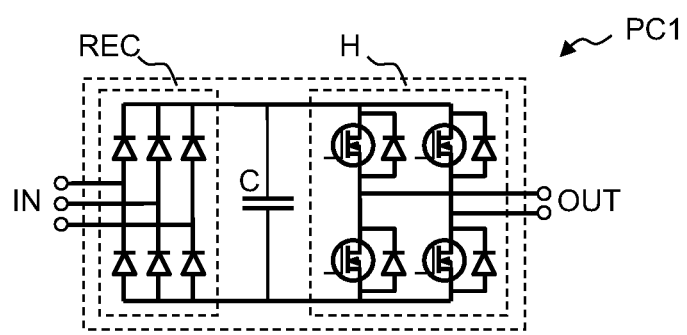
Figure 5:
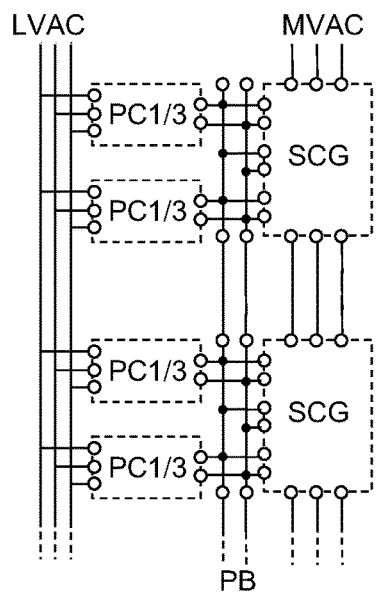
FIG. 5 presents part of a frequency converter between low and medium-voltage networks according to an exemplifying and non-limiting embodiment of the present invention.

FIG. 1A presents an example of a power cell PC1, which can be used in a prior art frequency converter of FIG. 1 and also in the embodiment of FIG. 5 of a frequency converter according to the present invention. The power cell comprises a three-phase diode bridge REC which rectifies the AC voltage connected to the input terminals IN, an intermediate DC-link filtering capacitor C and a power semi-conductor switching circuit H which is known in the art as a H-bridge. The H-bridge comprises two phase switches, each having an upper leg and a lower leg controllable power semiconductor switch, e.g. a MOSFET or an IGBT as in the figure, with an antiparallel diode. The H-bridge provides to the output terminals OUT an output voltage, which consists of rectangular pulses whose height is the intermediate DC-link voltage. The control arrangements of a power cell are not discussed in this context as they are known to those skilled in the art.

Figure 2:
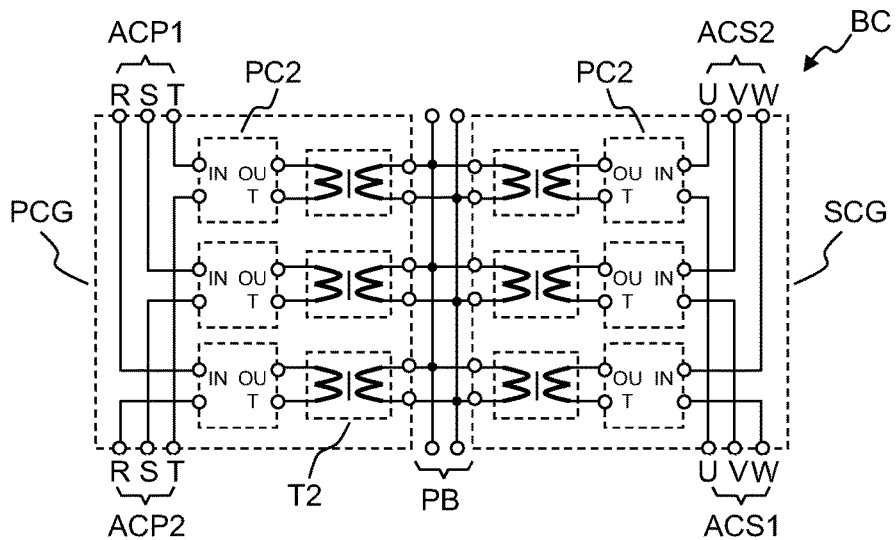
FIG. 2 presents a basic arrangement of a converter circuitry according to an exemplifying and non-limiting embodiment of the present invention.

FIG. 2 presents a basic converter coupling BC according to the present invention. In this form the converter coupling BC may be part of a medium-voltage frequency converter. The coupling comprises a primary power cell group PCG having three-phase input AC-voltage terminals ACP1 and three-phase output AC-voltage terminals ACP2, a secondary power cell group SCG having three-phase input AC-voltage terminals ACS1 and three-phase output AC-voltage terminals ACS2, and a power bus PB. The power cell group PCG comprises three power cells PC2 such that each power cell of the group is connected to a same phase terminal R, S or T of both input and output terminals ACP1, ACP2, via its input connections IN, and to the power bus via its output connections OUT and a transformer T2. Correspondingly, the power cell group SCG comprises three power cells PC2 such that each power cell of the group is connected to the same phase terminal U, V or W of both input and output terminals ACS1, ACS2, via its input connections IN, and to the power bus via its output connections OUT and a transformer T2.

Figure 2A:
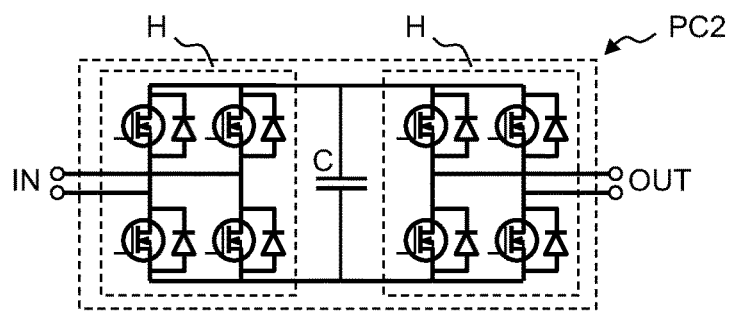
FIG. 2A presents a power cell according to an exemplifying and non-limiting embodiment of the present invention.

FIG. 2A presents the power circuit coupling of power cell PC2. It comprises a first and a second H-bridge, coupled to the input and output terminals IN, OUT, respectively, and an intermediate DC-link filtering capacitor coupled to both H-bridges. During operation of the converter coupling the H-bridge coupled to the OUT-terminal is controlled such that the voltage waveforms of all output connections (OUT) of the low-voltage power cells connected to the same power bus are essentially cophasal with 50% pulse ratio. Due to the simultaneous operation of the H-bridges connected to a common power bus, the intermediate circuits of the power cells are virtually bound together, which enables the power flow from a DC-link capacitor with higher voltage to a DC-link capacitor with lower voltage. This effect forms the basis for the operation of the converter according to the present invention. The operation of the H-bridge coupled to the IN-terminal is coordinated with the operation of the other similar power cell H-bridges such that e.g. in a medium-voltage environment a multistep output voltage pattern that imitates a sine waveform is formed to both the first and the second electric network connections at the respectively desired frequencies.

Figure 3:
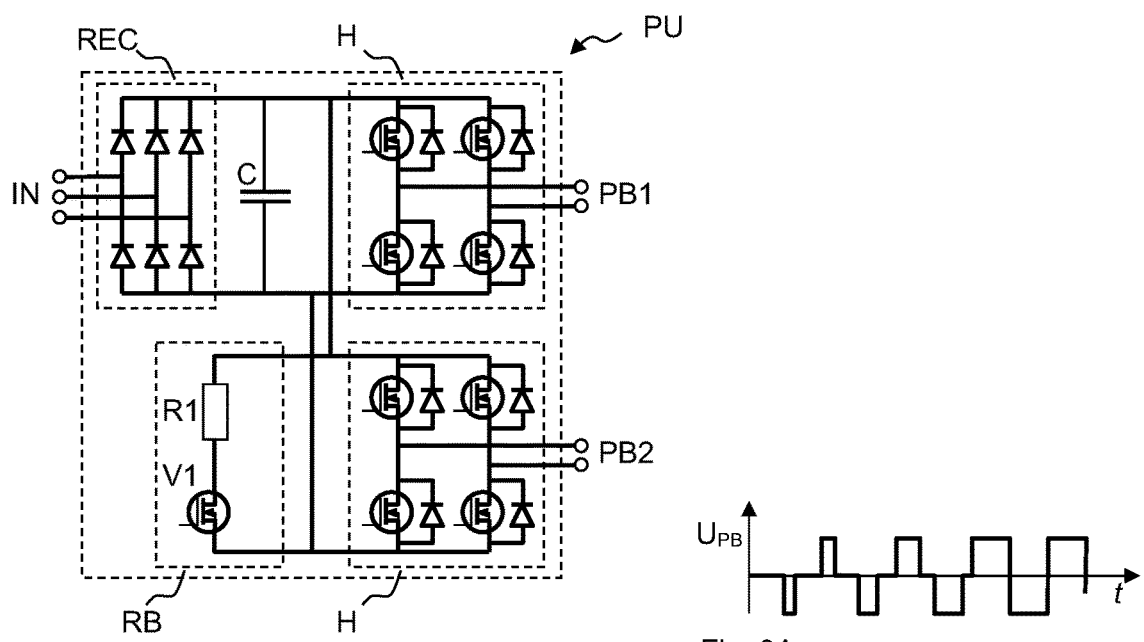
FIG. 3 presents a low-voltage power unit according to an exemplifying and non-limiting embodiment of the present invention.

FIG. 3 presents a low-voltage power unit PU, which is coupled to the at least one power bus PB of the converter coupling according to the present invention. The low-voltage power unit comprises terminals IN for a low-voltage supplying input voltage, a diode rectifier REC and an intermediate DC-link filtering capacitor C. Further, PU comprises at least one H-bridge which is connected to the power bus of the converter. In the example of FIG. 3 PU comprises two H-bridges with terminals PB1 and PB2 for the coupling to two power buses. Further, the low-voltage power unit PU may comprise an internal or an external optional device RB for resistor braking of the converter. RB comprises a controllable power semiconductor switch V1 and a resistor R1. The invention is not limited to one single RB as there may be several in parallel. Resistor braking may be needed e.g. in a situation where the supply voltage of the converter is cut off and the motor, coupled to the converter output connection, should be stopped quickly. In that situation the voltage of the power bus is rectified by the free-wheeling diodes of the H-bridges of the low-voltage power unit PU, and the power switch V1 is turned on. Thus the braking power of the motor flows via the secondary side power cells of the converter to the power bus, further to the intermediate DC-link of PU and finally to the braking resistor R.

Figure 3A:
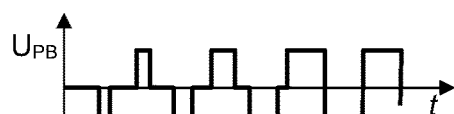
FIG. 3A illustrates the voltage waveform of the power bus according to the present invention for pre-charging.

FIG. 3A illustrates a characteristic voltage waveform, generated by the low-voltage power unit PU at startup of the converter circuitry. At startup the DC-link capacitors of the power cells need to be pre-charged before the main supply voltage is connected to the terminals of the converter circuitry. The pre-charge is performed via the power bus such that the low-voltage power unit PU is energized first, and its H-bridges generate a rectangular voltage with increasing pulse ratio from 0 to 50%, as presented in FIG. 3A, thus supplying a voltage with rising effective value to the at least one power bus and further via the transformers and internal diodes of the power cells to the intermediate DC links of all power cells. The details of energizing the low-voltage power unit is part of general knowledge of the art, so they are not discussed further in this context.

FIG. 4 presents a medium-voltage frequency converter MVFC, as an example of the various embodiments that the present invention makes possible. In this case the converter coupling comprises two power buses, PB1 and PB2, and two power cell groups, CG1 and CG2, each group coupled to a power bus. The power cell groups comprise similar primary cell groups PCG and secondary cell groups SCG as presented in FIG. 2. The primary cell groups are connected in series by connecting the output voltage terminals ACP2 of a cell group to the input voltage terminals ACP1 of the next cell group. The primary side converter part is completed by connecting the input terminals of the first cell group to the medium-voltage supply MVAC1 and by short-circuiting the output terminals of the last primary cell group. Similarly, the secondary side converter part is completed by connecting the cell groups in series, short-circuiting the input terminals of the last cell group and connecting the output terminals of the first cell group to the load network MVAC2. The power buses PB1 and PB2 of the frequency converter are coupled to a low-voltage power unit PU, which is similar as presented in FIG. 3.

In the example of FIG. 4 the number of power cell groups at both sides of the power buses is the same, which means that also the voltage level at the supply and at the load side is the same. It is also possible to use different number of power cells at the primary and secondary sides, in which case also the corresponding voltage levels may be different.

FIG. 4A illustrates the voltage waveforms of the two power buses PB1 and PB2 during operation of the frequency converter MVFC of FIG. 4. According to the invention, the two H-bridges of the low-voltage power unit PU are controlled such that there is a phase shift angle between the power bus waveforms, in this example 180°. The phase shift has a beneficial effect on decreasing the high-frequency emission from the frequency converter MVFC to the environment.

FIG. 5 presents part of a frequency converter between a low-voltage electricity network LVAC and a medium-voltage electricity network MVAC, as an example of the various embodiments that the present invention makes possible. In this case, the secondary side power cell groups SCG are similar to those shown in FIG. 2 and they are connected in series in the same manner as in FIG. 4. In case of unidirectional power flow from LVAC to MVAC the primary side power cells can be similar to those of FIG. 1A and all of them have been coupled in parallel. In case of bidirectional power flow, power cells PC3 of FIG. 5A can be used in the primary side. FIG. 5 shows also the possibility enabled by a device according to the invention, wherein the number of primary side power cells is different from the number of secondary side power cells.

In the example of FIG. 5 all the primary side power cells PC1/3 are connected in parallel to the same low-voltage network LVAC. It is also possible that the primary side power cells are connected to a few separate low-voltage networks by groups or even that each primary side power cell is connected to an own low-voltage network, e.g. in case of power distribution from a medium-voltage network to a number of separate low-voltage networks.

FIG. 5A presents the power circuit coupling of power cell PC3. It comprises an three-phase inverter bridge INU coupled to the input connection IN, a H-bridge coupled to the output connection OUT, and an intermediate DC-link filtering capacitor between them. During operation of the converter coupling the H-bridge coupled to the OUT-terminal is controlled such that the voltage waveforms of all output connections (OUT) of the low-voltage power cells connected to the same power bus are essentially cophasal with 50% pulse ratio. The control of the inverter bridge INU may be similar to that of a known prior art active front end PWM converter, which enables a bidirectional power flow. Normally a filter unit, e.g. a known so-called LCL filter comprising a first and a second inductive filter parts and a capacitive filter part between them, is used between the AC terminals of INU and the low-voltage network (not presented). It can be noted that, although the INU bridge of FIG. 5A power cell PC3 is shown as a conventional 2-level Voltage Source inverter, any Voltage Source inverter (e.g. 3-level, 5-level etc.) can be used.

Figure 6:
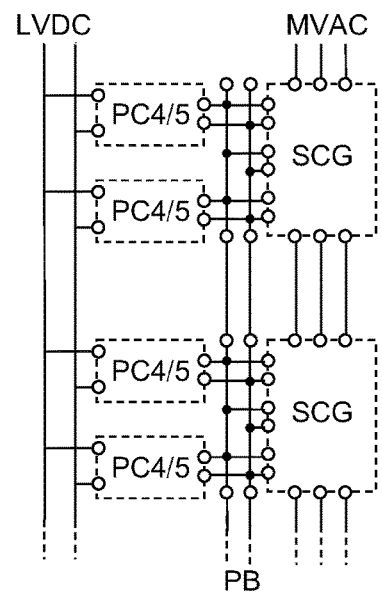
FIG. 6 presents part of an inverter between a low-voltage DC network and a medium-voltage network according to an exemplifying and non-limiting embodiment of the present invention.

FIG. 6 presents part of a converter which can supply power between a low-voltage direct current network LVDC and a medium-voltage load network MVAC, as an example of the various embodiments that the present invention makes possible. In this case, the secondary side power cell groups SCG are similar to those shown in FIG. 2 and they are connected in series in the same manner as in FIG. 4. In the primary side, the power cells PC4 or PC5 are specific for DC supply voltage, as presented in more detail in FIGS. 6A and 6B. In the example of FIG. 6 all the primary side power cells PC4/5 are connected in parallel to the same low-voltage network LVDC. It is also possible that the primary side power cells are connected to a few separate low-voltage networks by groups or even that each primary side power cell is connected to an own low-voltage network. It is also possible that the MVAC network is the source such that the power flows via power cell PC4 or PC5 to the LVDC network.

Figure 6A:
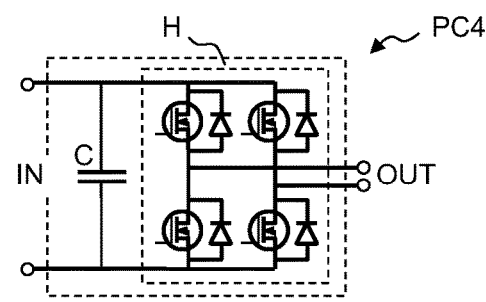
FIG. 6A presents a power cell according to an exemplifying and non-limiting embodiment of the present invention.

FIG. 6A presents the power circuit coupling of a power cell PC4, which enables a bidirectional power flow between the LVDC and MVAC networks of FIG. 6. The input side comprises only the terminals IN for the DC voltage connection. Otherwise the power cell is similar to the other ones presented above, with an intermediate DC-link capacitor C and a H-bridge for the power bus connection.

Figure 6B:
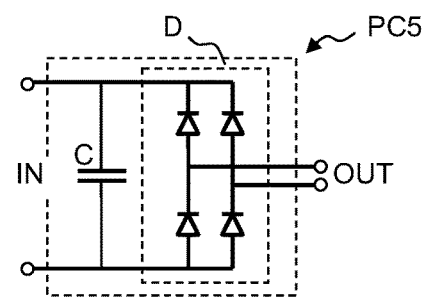
FIG. 6B presents a power cell according to an exemplifying and non-limiting embodiment of the present invention.

FIG. 6B presents the power circuit coupling of a power cell PC5, which enables only an unidirectional power flow from MVAC network to LVDC network of FIG. 6. In the output side, only a diode bridge D is used for rectifying power bus voltage, coupled via a transformer to OUT connections, to the intermediate DC-link capacitor C and further to the input connection IN.

Figure 7:
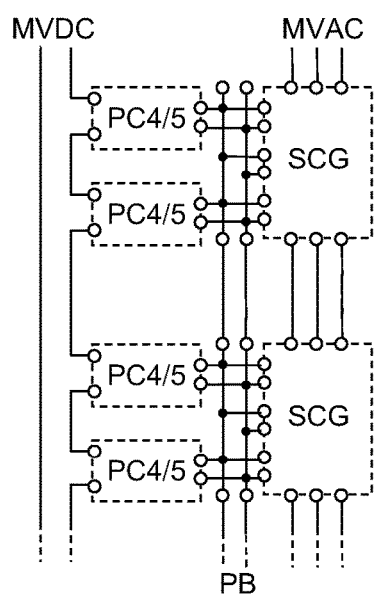
FIG. 7 presents part of an inverter between a medium-voltage DC network and a medium-voltage AC network according to an exemplifying and non-limiting embodiment of the present invention.

FIG. 7 presents part of a converter which can supply power between a medium-voltage direct current network MVDC and a medium-voltage load network MVAC, as an example of the various embodiments that the present invention makes possible. In this case, the secondary side power cell groups SCG are similar to those shown in FIG. 2 and they are connected in series in the same manner as in FIG. 4. As in the examples of FIG. 6, in primary side power cells PC4 are used in a bidirectional power flow case and power cells PC5 may be used in an unidirectional power flow case from MVAC network to LVDC. In the medium-voltage DC network all primary side power cells have been coupled in series.

Figure 8:
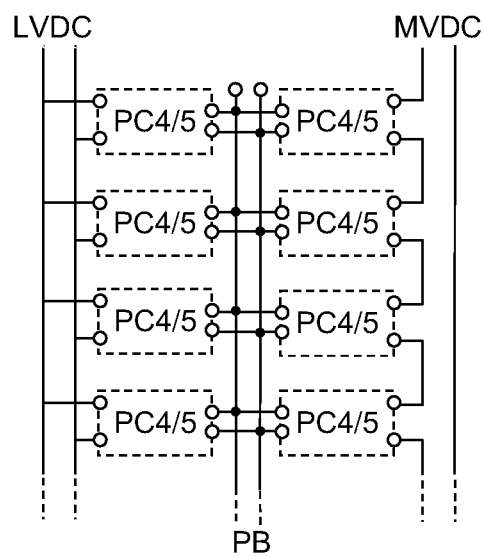
FIG. 8 presents part of a power converter between a low-voltage DC network and a medium-voltage DC network according to an exemplifying and non-limiting embodiment of the present invention.

FIG. 8 presents part of a converter which can supply power between a MVDC network and a LVDC network.

It should be noted that in order to increase the power rating of the converter circuitry according to the present invention, power cells can be coupled in parallel also in both sides (not presented in Figures).

The converter according to the present invention comprises also a control unit for ensuring coordinated operation of the input terminal (IN) side H-bridges of the power cells, in order to e.g. form a multistep output voltage pattern to the load network connection and also to the supplying network connection in the medium-voltage supply case. The control unit also takes care of the synchronized operation of the output terminal (OUT) side H-bridges of those power cells connected to a same power bus. However, since the details of the control system do not fall within the scope of this invention, a more detailed explanation of the control unit and its functions is omitted from this document.

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also un-recited features. Furthermore, it is to be understood that the use of "a" or "an", i.e. a singular form, throughout this document does not exclude a plurality.

What is claimed is:

1. A converter circuitry configured to transmit power between a first electricity network and a second electricity network, the first electricity network being either a single-phase DC network or a polyphase AC network, and the second electricity network being either a single-phase DC network or a polyphase AC network, the converter circuitry comprising:

a plurality of low-voltage power cells which are connected from their input connections (IN) to the first electricity network, a plurality of low-voltage power cells which are connected from their input connections (IN) to the second electricity network, at least one power bus, wherein the output connections (OUT) of each power cell are coupled to a power bus via a transformer, and wherein each low-voltage power cell comprises an intermediate DC link capacitor and a controllable power semiconductor H-bridge coupled to the output connection (OUT), and wherein the at least one power bus is coupled to a low-voltage power unit which is able to generate an AC voltage with varying pulse ratio to all power buses connected to it.

2. The converter circuitry of claim 1, wherein the low-voltage power unit, before the converter circuitry is connected to the first electricity network, is configured to generate a rectangular AC voltage, whose pulse ratio increases from 0 to 50%, to the at least one power bus and thereby charge up the intermediate DC link capacitors of all low-voltage power cells belonging to the converter circuitry.

3. The converter circuitry of claim 2, further comprising a control unit, operatively connected to those H-bridges which are coupled to the output connections (OUT) of the low-voltage power cells, which control unit is configured to control the H-bridge controllable semiconductor switches during converter operation such that the voltage patterns of all the output connections (OUT) of the low-voltage power cells, connected to a same power bus, are essentially cophasal with 50% pulse ratio.

4. The converter circuitry of claim 2 in a system wherein the second electricity network is a medium-voltage level polyphase AC network, and
wherein the power cells on the second electricity network side are arranged such that the number of power cells associated with each second electricity network phase is equal and the input connections (IN) of the single or parallel coupled power cells at each phase are connected in series.

5. The converter circuitry of claim 2 in a system wherein the second electricity network is a medium-voltage level DC network, and
wherein the power cells on the second electricity network side are arranged such that the input connections (IN) of the single or parallel coupled power cells are connected in series.

6. The converter circuitry of claim 1, further comprising a control unit, operatively connected to those H-bridges which are coupled to the output connections (OUT) of the low-voltage power cells, which control unit is configured to control the H-bridge controllable semiconductor switches during converter operation such that the voltage patterns of all the output connections (OUT) of the low-voltage power cells, connected to a same power bus, are essentially cophasal with 50% pulse ratio.

7. The converter circuitry of claim 6, wherein the number of power buses is at least 2 and wherein, during converter operation, the control unit is configured to control the controllable semiconductor switches of those H-bridges which are coupled to the output connections (OUT) of the low-voltage power cells such that there is a phase shift angle between voltage patterns of the at least 2 power buses.

8. The converter circuitry of claim 7 in a system wherein the second electricity network is a medium-voltage level polyphase AC network, and
wherein the power cells on the second electricity network side are arranged such that the number of power cells associated with each second electricity network phase is equal and the input connections (IN) of the single or parallel coupled power cells at each phase are connected in series.

9. The converter circuitry of claim 6, comprising one power bus.

10. The converter circuitry of claim 9 in a system wherein the second electricity network is a medium-voltage level polyphase AC network, and
wherein the power cells on the second electricity network side are arranged such that the number of power cells associated with each second electricity network phase is equal and the input connections (IN) of the single or parallel coupled power cells at each phase are connected in series.

11. The converter circuitry of claim 6 in a system wherein the second electricity network is a medium-voltage level polyphase AC network, and
wherein the power cells on the second electricity network side are arranged such that the number of power cells associated with each second electricity network phase is equal and the input connections (IN) of the single or parallel coupled power cells at each phase are connected in series.

12. The converter circuitry of claim 6 in a system wherein the second electricity network is a medium-voltage level DC network, and
wherein the power cells on the second electricity network side are arranged such that the input connections (IN) of the single or parallel coupled power cells are connected in series.

13. The converter circuitry of claim 1 in a system wherein the second electricity network is a medium-voltage level polyphase AC network, and
wherein the power cells on the second electricity network side are arranged such that the number of power cells associated with each second electricity network phase is equal and the input connections (IN) of the single or parallel coupled power cells at each phase are connected in series.

14. The converter circuitry of claim 1 in a system wherein the second electricity network is a medium-voltage level DC network, and
wherein the power cells on the second electricity network side are arranged such that the input connections (IN) of the single or parallel coupled power cells are connected in series.

15. The converter circuitry of claim 1 in a system wherein the first electricity network is a medium-voltage level polyphase AC network, and
wherein the power cells on the first electricity network side are arranged such that the number of power cells associated with each first electricity network phase is equal and the input connections (IN) of the single or parallel coupled power cells at each phase are connected in series.

16. The converter circuitry of claim 1 in a system, wherein the first electricity network comprises at least one low-voltage level polyphase AC network, and
wherein the input connection (IN) of each power cell at the first electricity network side is connected to one low-voltage level polyphase AC network.

17. The converter circuitry of claim 1 in a system, wherein the first electricity network comprises at least one low-voltage level DC network, and
wherein the input connection (IN) of each power cell at the first electricity network side are connected to one low-voltage level DC network.

18. The converter circuitry of claim 1 in a system, wherein the first electricity network is a medium-voltage level DC network, and
wherein the input connections (IN) of the single or parallel coupled power cells at the first electricity network side are connected in series.

19. A method in a converter circuitry of claim 1 for controlling a H-bridge of a low-voltage power unit, the method comprising an initial phase where the H-bridge generates to the at least one power bus a rectangular AC voltage whose pulse ratio increases from 0 to 50%, and a normal operation phase where the H-bridge operation is stopped.

20. A method in a converter circuitry of claim 1, the method comprising control of the controllable semiconductor switches of those H-bridges, which are coupled to the output connections (OUT) of the low-voltage power cells, during converter operation such that the voltage patterns of all power cell output connections, connected to a same power bus, are essentially cophasal with 50% pulse ratio.

* * * * *